United States Patent
Hosabettu et al.

(10) Patent No.: US 10,102,093 B2
(45) Date of Patent: Oct. 16, 2018

(54) METHODS AND SYSTEMS FOR DETERMINING AN EQUIPMENT OPERATION BASED ON HISTORICAL OPERATION DATA

(71) Applicant: Wipro Limited, Bangalore (IN)

(72) Inventors: Raghavendra Hosabettu, Bangalore (IN); Anil Kumar Lenka, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 156 days.

(21) Appl. No.: 15/075,449

(22) Filed: Mar. 21, 2016

(65) Prior Publication Data
US 2017/0262297 A1    Sep. 14, 2017

(30) Foreign Application Priority Data

Mar. 9, 2016 (IN) .............................. 201641008219

(51) Int. Cl.
*G06F 11/00*     (2006.01)
*G06F 11/30*     (2006.01)
(Continued)

(52) U.S. Cl.
CPC ............ *G06F 11/3024* (2013.01); *G06F 8/61* (2013.01); *G06F 9/4411* (2013.01); *G06F 11/3409* (2013.01); *G06F 8/36* (2013.01)

(58) Field of Classification Search
CPC combination set(s) only.
See application file for complete search history.

(56) References Cited

U.S. PATENT DOCUMENTS

| 5,483,637 | A | * | 1/1996 | Winokur ................. H04L 43/00 714/26 |
| 6,915,282 | B1 | | 7/2005 | Conway et al. |

(Continued)

OTHER PUBLICATIONS

Hüllermeier, E., Exploiting Similarity for Supporting Data Analysis and Problem Solving; Advances in Intelligent Data Analysis: Third International Symposium; proceedings/ IDA-99, Amsterdam, The Netherlands, Aug. 9-11, 1999 P; Lecture Notes in Computer Science, vol. 1642, pp. 266-267; Springer, 1999.

*Primary Examiner* — Amine Riad
(74) *Attorney, Agent, or Firm* — Finnegan, Henderson, Farabow, Garrett & Dunner LLP

(57) ABSTRACT

This disclosure relates generally to data processing, and more particularly, to methods and systems for determining an equipment operation based on historical data. In one embodiment, a hardware processor-implemented method for facilitating an operation of a device is provided. The method comprises: receiving an indication of an operation problem for a first device; acquiring historical operation data of a plurality of devices including the first device, the historical operation data including structured data and unstructured data; determining at least a list of first entities and a list of second entities based on the structured data; determining a set of entity associations, each entity association including at least one of the first entities and at least one of the second entities; determining one or more relationships between each of the entity associations; and determining, based on the one or more determined relationships, an operation solution to solve the operation problem.

15 Claims, 5 Drawing Sheets

(51) Int. Cl.
*G06F 11/34* (2006.01)
*G06F 8/61* (2018.01)
*G06F 9/4401* (2018.01)
*G06F 8/36* (2018.01)

(56) References Cited

U.S. PATENT DOCUMENTS

| | | |
|---|---|---|
| 7,062,508 B2 | 6/2006 | Andreev et al. |
| 8,494,987 B2 | 7/2013 | Katukuri et al. |
| 2004/0204861 A1 | 10/2004 | Benner |
| 2007/0156720 A1 | 7/2007 | Maren |
| 2014/0172417 A1 | 6/2014 | Monk, II et al. |

* cited by examiner

FIG. 2A

| Device | Operation | Description Field |
|---|---|---|
| Printer | Installation | Printer cannot change setting cannot log into TC-300 |
| Laptop | Login | System not booting because WiFi too slow |
| Scanner | Configure | Cannot log into laptops cannot get driver because WiFi too slow |
| WiFi | Deployment | WiFi signal below threshold |

FIG. 2B

| Text in Description Field | Pair with |
|---|---|
| "change setting" | configure |
| "TC-300" | Laptop |
| "log into" | Login |
| "too slow" | deployment |

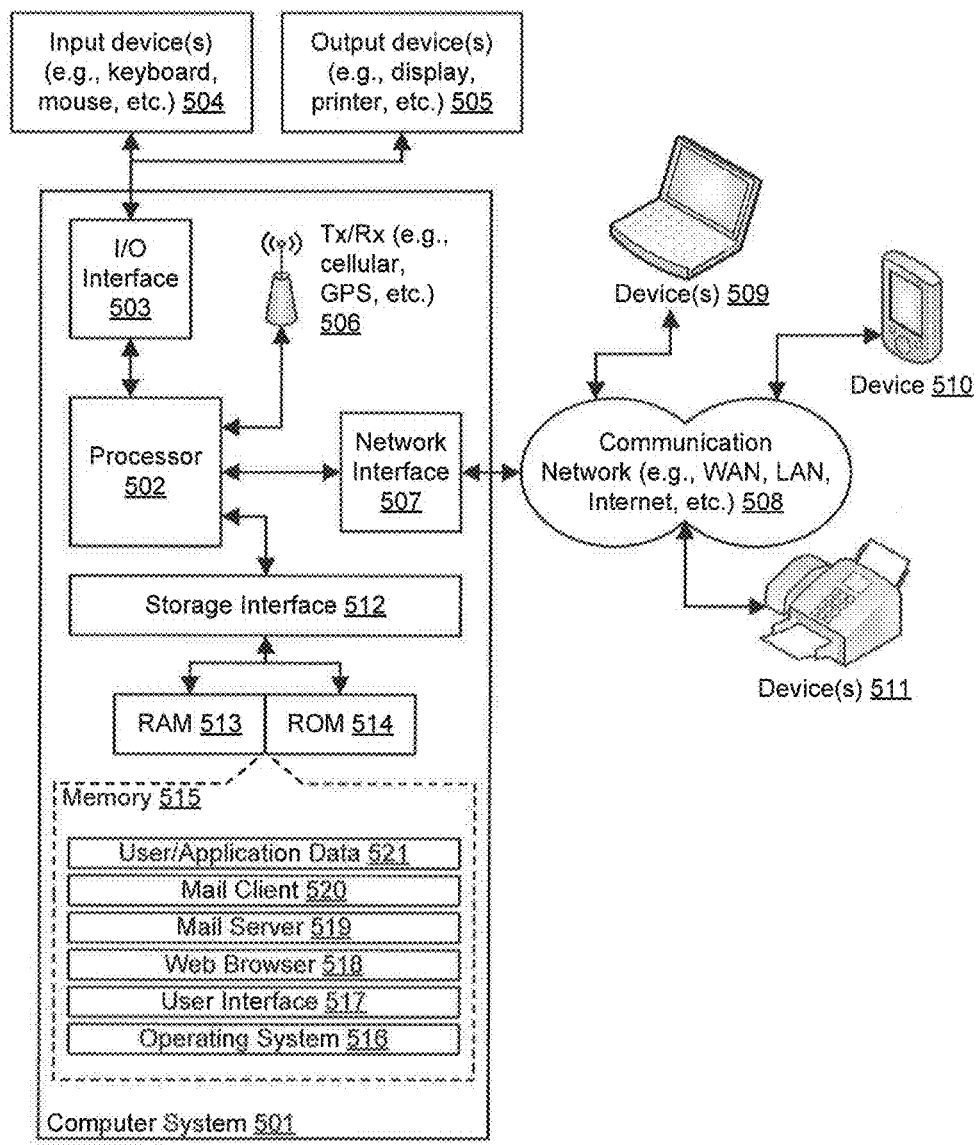
FIG. 5: Example Computer System

METHODS AND SYSTEMS FOR DETERMINING AN EQUIPMENT OPERATION BASED ON HISTORICAL OPERATION DATA

TECHNICAL FIELD

This disclosure relates generally to data processing, and more particularly, to methods and systems for determining an equipment operation based on historical data.

BACKGROUND

Nowadays, due to the proliferation of various types of electronic devices of different vendors and configurations, and that the operations of these electronic devices are typically interrelated, finding a solution to an operation problem of a malfunctioning electronic device can become very challenging. As an illustrative example, when a user transmits, from a computer terminal, a printing task to use a network printer, but the printer fails to perform the task, there can be different reasons for the failure. For example, the printer may be malfunctioning, or may have been configured improperly. There can also be a network connectivity issue that prevents the printer from receiving the printing task. In addition, the computer terminal may also be configured improperly (e.g., using a wrong version of printer driver). Considering also that these equipment can be of different vendors and of different configurations, the solution space can become so large that it becomes impractical to use a brute-force approach (e.g., exhausting different combinations of possible solutions) to find a solution to an operation problem of an electronic device.

One approach to solve this problem is to leverage historical operation data of the electronic device, and of other devices that are related to that electronic device. As an illustrative example, a user may experience a certain operation problem with a first electronic device when operating it with a second electronic device. If, in the past, there are a certain number of users who have also operated the two electronic devices in the same way as this user, and experienced the same operation problem, it can be hypothesized that the operation problem with the first electronic device is caused by (or at least is connected to) the second electronic device.

Historical operation data of electronic devices can exist in different places and in different forms. For example, these data can be stored in enterprise service tickets, server logs, etc. These data typically come in two forms: structured data and unstructured data. Structured data can include a set of discrete data that are associated with specific fields which give meaning to the set of discrete data. For example, a service ticket may include fields for inputting a type of electronic device (e.g., printer, laptop, etc.), an operation of the device (e.g., configuration, installation, etc.), etc. Unstructured data, on the other hand, can include data that are associated with a generic field (e.g., description of problem) and is not imparted with a pre-determined structure.

A conventional system typically accumulates these historical operation data (both structured and unstructured), and apply regular association rules, as well as machine learning algorithms like classification, clustering, or regression methods, to look for relationship between operation data of different devices. Based on the relationship, the system may then determine a hypothesis for the cause of an operation problem, as well as the solution based on the hypothesis.

The inventors here have recognized several technical problems with such conventional systems. First, as discussed before, historical data can come in a structured form and an unstructured form. While data in structured form may carry a certain meaning (imparted by the structured field a piece of data is associated with), data in unstructured form can include many hidden information that is difficult to be extracted using regular association rules and machine learning algorithms. As an illustrative example, a convention system may not understand the meaning of a text description of "printer not working, cannot log into TC-300," nor can it classify and cluster different segments of the text, without the text being imparted with a structure that defines the meaning of each portion of the text.

Second, while natural language processing may provide some insight into how a text description can be interpreted, it becomes difficult to apply such processing to the extent that it generates a meaning for the whole text description, when there is huge volume of unstructured historical data and of different formats.

SUMMARY

Embodiments of the present disclosure present technological improvements as solutions to the above-mentioned technical problems, among others. For example, in one embodiment, a hardware processor-implemented method for facilitating an operation of a device is provided. The method is performed by one or more hardware processors and comprises: receiving an indication of an operation problem for a first device; acquiring historical operation data of a plurality of devices including the first device, the historical operation data including structured data and unstructured data; determining at least a list of first entities and a list of second entities based on the structured data; determining, based on the structured and unstructured data, a frequency of association between each of the first entities and each of the second entities; determining, based on the frequency of association, a set of entity associations, each entity association including at least one of the first entities and at least one of the second entities; determining one or more relationships between each of the entity associations; and determining, based on the one or more determined relationships, an operation solution to solve the operation problem.

In another embodiment, a system for facilitating an operation of a device is provided. The system comprises: one or more hardware processors; and a memory storing instructions executable by the one or more hardware processors for: receiving an indication of an operation problem for a first device; acquiring historical operation data of a plurality of devices including the first device, the historical operation data including structured data and unstructured data; determining at least a list of first entities and a list of second entities based on the structured data; determining, based on the structured and unstructured data, a frequency of association between each of the first entities and each of the second entities; determining, based on the frequency of association, a set of entity associations, each entity association including at least one of the first entities and at least one of the second entities; determining one or more relationships between each of the entity associations; and determining, based on the one or more determined relationships, an operation solution to solve the operation problem.

In yet another embodiment, a non-transitory computer readable storage medium is provided. The non-transitory computer readable medium may store a program that, when executed by one or more hardware processors, causes the one or more hardware processors to perform a method for facilitating an operation of a device, the method comprising: receiving an indication of an operation problem for a first device; acquiring historical operation data of a plurality of devices including the first device, the historical operation data including structured data and unstructured data; determining at least a list of first entities and a list of second entities based on the structured data; determining, based on the structured and unstructured data, a frequency of association between each of the first entities and each of the second entities; determining, based on the frequency of association, a set of entity associations, each entity association including at least one of the first entities and at least one of the second entities; determining one or more relationships between each of the entity associations; and determining, based on the one or more determined relationships, an operation solution to solve the operation problem.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 2A-2B illustrate exemplary historical operation data records that can be processed by an exemplary historical equipment operation data analytics system, according to some embodiments of the present disclosure.

FIG. 5 is a block diagram of an exemplary computer system for implementing embodiments consistent with the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Illustrative embodiments of the present disclosure are listed below. In one embodiment, a system for facilitating an operation of a device is provided. The system comprises: one or more hardware processors; and a memory storing instructions executable by the one or more hardware processors for: receiving an indication of an operation problem for a first device; acquiring historical operation data of a plurality of devices including the first device, the historical operation data including structured data and unstructured data; determining at least a list of first entities and a list of second entities based on the structured data; determining, based on the structured and unstructured data, a frequency of association between each of the first entities and each of the second entities; determining, based on the frequency of association, a set of entity associations, each entity association including at least one of the first entities and at least one of the second entities; determining one or more relationships between each of the entity associations; and determining, based on the one or more determined relationships, an operation solution to solve the operation problem.

With embodiments of the present disclosure, a system may obtain a frequency relationship between the operation data of different devices. Based on the frequency relationship, a system may determine a degree of association between the operations of two different devices. Based on the degree of association, the system may determine a hypothesis for the cause of an operation problem of one of the devices, as well as the solution based on the hypothesis. The hypothesis can also be validated by, for example, applying the determined solution to the operation problem and determining a result (e.g., whether the operation problem has been resolved). With embodiments of the present disclosure, hidden interrelated information can be extracted from the unstructured historical operation data. As a result, the solution can be generated more efficiently and accurately.

Figure 1:
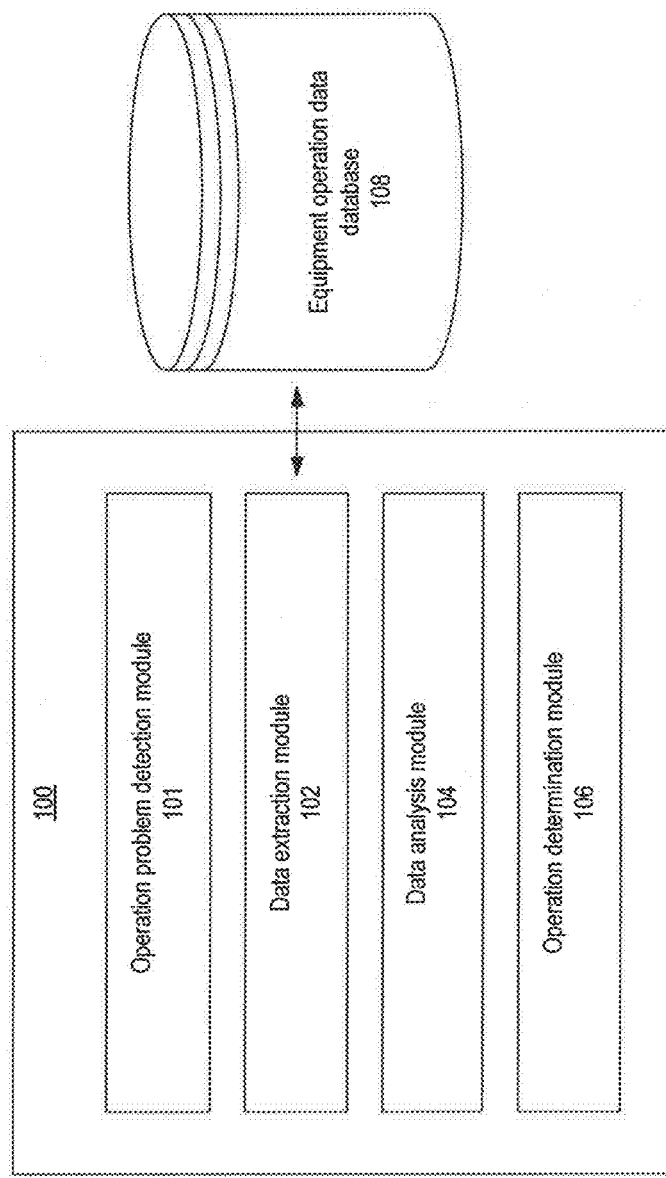
FIG. 1 illustrates an exemplary historical equipment operation data analytics system, according to some embodiments of the present disclosure.

FIG. 1 illustrates an exemplary historical equipment operation data analytics system 100, according to some embodiments of the present disclosure. As shown in FIG. 1, system 100 may include an operation problem detection module 101, a data extraction module 102, a data analysis module 104, and an operation determination module 106. For the purposes of this disclosure, "modules" may be implemented in software, hardware, firmware, a mix of any of those, or the like. For example, if the disclosed "modules" are implemented in software, they may be stored in a memory associated with system 100. Processors, I/O devices, and memory devices may be used to perform processes to implement and facilitate operations of the modules. Thus, the modules may include code instructions executable by one or more processors, alone or in various combinations with other modules disclosed in this or other embodiments. If the disclosed "modules" are implemented in hardware, they may comprise an embedded system or other dedicated hardware configured by machine code, assembly code, or the like to interact with other modules to perform functions consistent with disclosed embodiments.

In some embodiments, operation problem detection module 101 may receive indication about an operation problem with a device. The indication can come from, for example, a ticket filed by a user about an operation problem with a device, a real-time monitoring of an operation of a device (e.g., a volume of data traffic through a WiFi hotspot, logging in of a terminal, printing/scanning tasks transmitted over the network, etc.).

After receiving an indication of operation problem from operation problem detection module 101, data extraction module 102 may acquire historical operation data, and then extract information from the historical data for determining a solution to the operation problem. The historical operation data acquired may be related to the device of which an operation problem has been detected/reported (e.g., the historical operation data including historical operation data of that device), and can include structured data portion and unstructured data portion. As discussed before, structured data can include a set of discrete data that are associated with specific fields which give meaning to the set of discrete data. Unstructured data, on the other hand, can include data associated with a generic field and is not imparted with a pre-determined structure.

In some embodiments, data extraction module 102 can first extract a first data set from the structured data portion. Data extraction module 102 can then determine an occurrence of elements of the first data set in the unstructured data portions, and a relationship between the elements of the first data set, as a second data set. Data extraction module 102 can then provide the second data set to data analysis module 104 for analysis.

Reference is now made to FIG. 2A, which illustrates an exemplary historical operation data record 200, which can be processed by data extraction module 102. As shown in FIG. 2A, record 200 can include field 202 of "Device", field 204 of "Operation" and field 206 of "Description Field." Record 200 can be generated from enterprise service tickets, with each field corresponding to a field in a service ticket, and each row storing a combination of data of fields 202, 204, and 206 associated with a particular ticket. Record 200, and other related information, may be stored in a database, such as equipment operation data database 108 of FIG. 1.

In some embodiments, data extraction module 102 may retrieve record 200 and a schema associated with an enterprise ticket from database 108. The schema may define the fields (e.g., field 202 is "Device", field 204 of "Operation" and field 206 of "Description Field", etc.). The schema may provide an indication of whether the data associated with a field is structured or unstructured. For example, based on the schema, data extraction module 102 may determine that data associated with field 202 ("printer", "laptop", "scanner", and "WiFi") as structured data, since the name of field 202 ("device") provides meaning to each piece of discrete data associated with the field (e.g., each refers to a type of device). Data extraction module 102 may also determine that data associated with field 204 ("configure", "login", "installation, and "deployment") as structured data as well, since the name of field 204 ("operation") provides meaning to each piece of discrete data associated with the field (e.g., each refers to a type of operation). Data extraction module 102 may designate each data entry of fields 204 and 206 as an entity. Data extraction module 102 may also determine, based on the schema, that data associated with field 206 ("Description field") is unstructured.

Based on the determination, data extraction module 102 can generate a first set of data from the structured data, including data associated with fields 202 and 204, to include two entity lists which, in this case, include the data entries of fields 204 and 206:

First entity list: {"printer", "laptop", "scanner", and "WiFi"}

Second entity list: {"configure", "login", "installation", and "deployment"}

After creating the entity lists based on the structured data portion, data extraction module 102 can search the unstructured data portion (data associated with field 206) for the occurrence of the entities from the first and second data lists. Based on the search result, data extraction module 102 can generate a second data set. The second data set may reflect, for example, a frequency of association between the entities in the first and second data lists.

The searching can be performed in various manners. For example, data extraction module 102 can look for texts in the unstructured data portion that are identical to the texts associated with the entities in the first and second entity lists. As an illustrative example, as shown in FIG. 2A, descriptions 204 and 206 include the text "WiFi" which is an entity in the first entity list. Data extraction module 102 can determine that for description 214, the text "WiFi" is associated with a "login" operation (e.g., based on the corresponding data entry for field 204), and can create an association between the entities "WiFi" and "login". Further, data extraction module 102 can also determine that for description 216, the text "WiFi" is associated with an "installation" operation (e.g., based on the corresponding data entry for field 204), and can create an association between the entities "WiFi" and "Installation".

Moreover, the searching can also include identifying texts with identical (or similar) meanings as the texts associated with the entities. Reference is now made to FIG. 2B, which illustrates an exemplary record 250 that stores a mapping between texts in the description field 206 and the texts associated with the entities in the first and second entity lists. For example, as shown in FIG. 2B, a text "change setting" can be paired with the entity "configure", texts "TC-300" and "CT-3" (which can be model numbers) can be paired with the entity "laptop", text "log into" can be paired with the entity "login", and text "too slow" can be paired with the entity "deployment". Record 250 can be constructed and updated using natural language processing and machine learning base on, for example, prior analysis of the description field, language semantics, etc. Based on the information in record 250, data extraction module 102 may determine that description 212 includes the entities "configure" (based on the text "change setting"), "login" (based on the text "log into"), and "laptop" (based on the text "TC-300"). Based on the determination, data extraction module 102 can create an association between the entities "laptop" and "configure", and an association between the entities "laptop" and "login" for description 212.

Further, the searching can also include filtering of the text associated with the description field based on one or more criteria, such as stop words (e.g., "and", "because", etc.) and punctuations (comma, full-stop, etc.), and the searching is performed only on the filtered text. For example, referring back to description 212 of FIG. 2A, data extraction module 102 may filter out the comma that is immediately after the text "change setting" before determining the entity paired with this text. The searching can also include further processing of the text, such as collapsing singular and plural variant of terms. For example, in description 216, data extraction module 102 may interpret the text "Laptops" as "laptop," and create an association between the entities "laptop" and "login" for description 216.

After processing record 200, data extraction module 102 may generate a frequency of association between the entities in the first and second data lists. For example, as discussed before, data extraction module 102 may create an association between the entities "WiFi" and "login", an association between the entities "WiFi" and "installation", an association between the entities "laptop" and "configure", and an association between the entities "laptop" and "login" based on the description fields 212-216 of record 200. An illustrative example of the frequency of association between the entities, based on these associations, can be represented below in Table 1:

TABLE 1

|         | Installation | Login | Configure | Deployment |
|---------|--------------|-------|-----------|------------|
| Printer | 0            | 0     | 0         | 0          |
| Laptop  | 0            | 1     | 1         | 0          |
| Scanner | 0            | 0     | 0         | 0          |
| WiFi    | 1            | 1     | 0         | 0          |

Assuming that record 200 includes other tickets and description fields, data extraction module 102 may generate the following frequency of association between the entities, as shown in Table 2:

TABLE 2

|         | Installation | Login | Configure | Deployment |
|---------|--------------|-------|-----------|------------|
| Printer | 2            | 2     | 1000      | 43         |
| Laptop  | 1            | 533   | 2         | 4          |
| Scanner | 342          | 2     | 23        | 40         |
| WiFi    | 1            | 12    | 23        | 333        |

The frequency of association can be used as an indication about the most prominent associations of entities (e.g., devices and operations) among the historical operation data of the devices. The frequency relationship may reflect the boundary of a solution space for a particular operation problem of a device. For example, as shown in Table 2, there are relatively few instances of ticket descriptions about printer installation (as reflected by the fact that there are only two instances of association between the entities "printer" and "installation" in Table 2). Therefore, it can be determined that "printer installation" is unlikely to be the root cause of an operation problem of another device (e.g., a scanner, laptop, etc.). As to be discussed below, data extraction module 102 may proceed to determine a relationship between different associations of entities, which can then be used to generate a hypothesis for the solution. For efficient operation, data extraction module 102 may only determine the relationship between associations of entities, when a number of occurrence of the associations, as indicated by the frequency relationship in Table 2, exceeds a certain threshold. For example, by setting a threshold of 100, data extraction module 102 may only determine the relationship between these entity associations: "laptop/login", "printer/configure", "WiFi/Deployment", and "Scanner/installation".

After determining a set of entity associations based on the frequency relationship, data extraction module 102 may determine a relationship between these entity associations. The relationship can include a degree of association between the entity associations. Using record 200 of FIG. 2A as an example, the degree of association can be determined based on, for example, whether texts representing the two entity associations can be found in the same ticket. In a case where the two entity associations are not in the same ticket, the degree of association can be determined based on whether there is a linkage between any two tickets in which the texts of the two entity associations are respectively present, and a distance of the linkage (e.g., a number of tickets that separate the two tickets). The degree of association can be expressed using a score. For example, a score of "1" can represent a degree of association where two entity associations are present in the same ticket (e.g., in the same description field 206, or in the description field 206 and fields 202 and 204 of the same ticket). A score of "2" can represent a degree of association between two entity associations present in two different tickets, but the two tickets also have a common third entity association.

As an illustrative example, description 212 includes an entity association of "laptop/login" (based on the texts "log into" and "TC-300") and "printer/configure" (based on the texts "printer" and "change setting"). Since these two entity associations occur in the same ticket, a score of "1" can represent their degree of association. Also, description 214 includes an entity association of "WiFi/deployment" (based on the texts "WiFi" and "too slow"). The texts of the device field 202 and operation field 206 associated with description 214, on the other hand, provide the entity association of "laptop/login". Therefore, a score of "1" can also represent the degree of association between the entity associations "laptop/login" and "WiFi/deployment" since their entity associations occur in the same ticket. Similarly, based on description 216 and the associated fields 202 and 204, a score of "1" can represent the degree of association between entities "laptop/login" and "scanner/configure", and between entities "WiFi/deployment" and "scanner/configure".

Moreover, in addition to the degree of association, the relationship between two entity associations may also include a direction, which can indicate, for example, a causality relationship. As an illustrative example, the text in the description field of a ticket may express a reason for a particular device operation problem. Accordingly, a direction component can be included in a relationship between an entity association obtained from the description field and an entity association obtained from the device field 202 and operation field 204.

Figure 3:
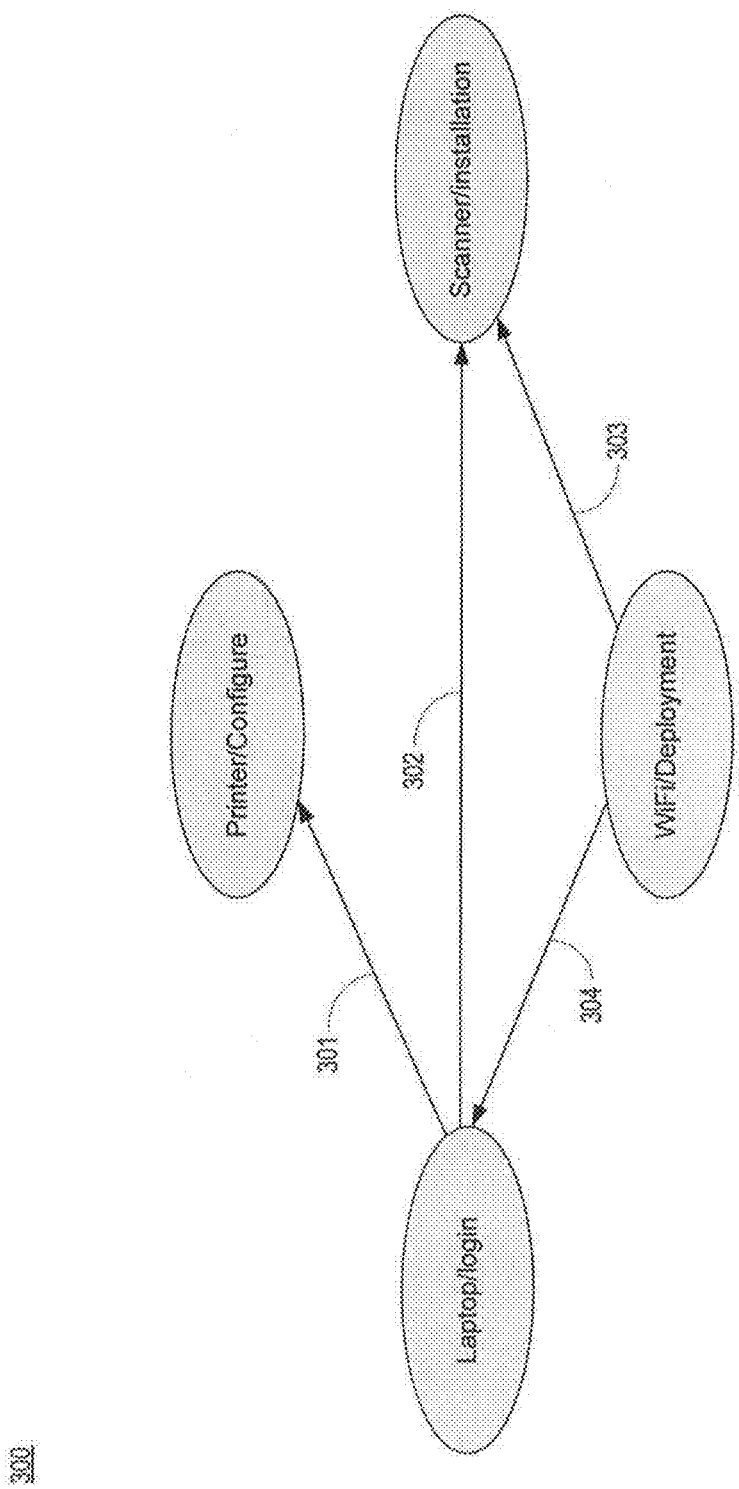
FIG. 3 illustrates a graphical representation of intermediate analysis results generated by an exemplary historical equipment operation data analytics system, according to some embodiments of the present disclosure.

A directed graphical representation of a degree of association, and a direction component, of the relationship the entity associations is illustrated in FIG. 3A. In FIG. 3A, an arrow can represent a direct path between two entity associations, which can indicate that the two entity associations can be found in the same ticket, therefore their degree of association can be represented with a score of "1". The arrowhead can be pointing to an entity association associated with device field 202 and operation field 204. For example, there is an arrow 301 from entity association "laptop/login" to entity association "printer/configure" (based on description field 212), an arrow 302 from entity association "laptop/login" to entity association "scanner/installation" (based on description field 216), an arrow 303 from entity association "WiFi/deployment" to entity association "scanner/installation" (also based on description field 216), and an arrow 304 from entity association "WiFi/deployment" to entity association "laptop/login" (based on description field 214).

Also, as shown in FIG. 3A, there is no direct path from entity association "WiFi/deployment" to entity association "printer/configure" because none of the tickets of record 200, illustrated in FIG. 2A, includes these two entity associations in the same ticket. However, the two entity associations can be linked indirectly via the entity association "laptop/login" because the two tickets in which the "printer/configure" and "WiFi/deployment" are found (tickets associated with description fields 212 and 216) include the entity association "laptop/login." Therefore, a score of "2" can be assigned to a degree of association between "printer/configure" and "WiFi/deployment".

Based on the above determinations, data extraction module 102 may generate, as part of a second set of data, an adjacency matrix. An adjacency matrix can be generated by counting a number of direct and indirect paths (with scores of "1" or "2", and follow the direction of the arrows)

between two entity associations. Table 3 below illustrates an adjacency matrix representing graph 300 of FIG. 3A:

TABLE 3

|  | Laptop/ Login | Printer/ Configure | WiFi/ Deployment | Scanner/ Installation |
|---|---|---|---|---|
| Laptop/ Login | 0 | 1 | 0 | 1 |
| Printer/ Configure | 0 | 0 | 0 | 0 |
| WiFi/ Deployment | 1 | 1 | 0 | 1 |
| Scanner/ Installation | 0 | 0 | 0 | 0 |

In some embodiments, after receiving the second set of data including data representing an adjacency matrix from data extraction module 102, data analysis module 104 may perform an analysis on the adjacency matrix data. For example, data analysis module 104 may perform a matrix computation, in which data analysis module 104 first computes a second matrix by performing a matrix multiplication of the adjacency matrix with itself, and performs matrix addition between the adjacency matrix and the second matrix to obtain a resultant matrix. The matrix computation is as follows:

$$A = M + M^2$$

Using the adjacency matrix of Table 3 as an example, the matrix computation can be as follows:

$$\begin{bmatrix} 0 & 1 & 0 & 1 \\ 0 & 0 & 0 & 0 \\ 1 & 1 & 0 & 1 \\ 0 & 0 & 0 & 0 \end{bmatrix} + \left\{ \begin{bmatrix} 0 & 1 & 0 & 1 \\ 0 & 0 & 0 & 0 \\ 1 & 1 & 0 & 1 \\ 0 & 0 & 0 & 0 \end{bmatrix} \times \begin{bmatrix} 0 & 1 & 0 & 1 \\ 0 & 0 & 0 & 0 \\ 1 & 1 & 0 & 1 \\ 0 & 0 & 0 & 0 \end{bmatrix} \right\} = \begin{bmatrix} 0 & 1 & 0 & 1 \\ 0 & 0 & 0 & 0 \\ 1 & 2 & 0 & 2 \\ 0 & 0 & 0 & 0 \end{bmatrix}$$

The resultant matrix may be represented below as represented below in Table 4:

TABLE 4

|  | Laptop/ Login | Printer/ Configure | WiFi/ Deployment | Scanner/ Installation |
|---|---|---|---|---|
| Laptop/ Login | 0 | 1 | 0 | 1 |
| Printer/ Configure | 0 | 1 | 1 | 0 |
| WiFi/ Deployment | 1 | 2 | 0 | 2 |
| Scanner/ Installation | 0 | 0 | 0 | 0 |

After computing the resultant matrix, data analysis module 104 may compute a summation of entries for each row of the resultant matrix, as shown below in Table 5:

TABLE 5

|  | Laptop/ Login | Printer/ Configure | WiFi/ Deployment | Scanner/ Installation | Sum of row |
|---|---|---|---|---|---|
| Laptop/ Login | 0 | 1 | 0 | 1 | 2 |
| Printer/ Configure | 0 | 1 | 1 | 0 | 2 |
| WiFi/ Deployment | 1 | 2 | 0 | 2 | 5 |
| Scanner/ Installation | 0 | 0 | 0 | 0 | 2 |

Data analysis module 104 may determine a hypothesis of a reason for an operation problem, based on the summation result. For example, as shown in Table 5, the row associated with the entity association "WiFi/deployment" has a sum of five, which is the largest among the rest of the rows of Table 5. Based on this determination, data analysis module 104 may determine, based on the historical operation data stored in record 200 of FIG. 2A, "WiFi deployment" is most likely a reason for an operation problem of a device listed in record 200. Data analysis module 104 can then transmit the result of the analysis, which can include a hypothesis of a reason for the operation problem, to operation determination module 106.

In some embodiments, operation determination module 106 may determine an operation solution based on the analysis result provided by data analysis module 104. For example, based on a determination that WiFi deployment is most likely a reason for an operation of a device, operation determination module 106 may determine, for example, a set of configurations for the equipment involved in the WiFi deployment. In some embodiments, operation determination module 106 may also receive a feedback related to the operation, which can be used to validate the hypothesized reason of the operation problem, as well as the operation solution.

Figure 4:
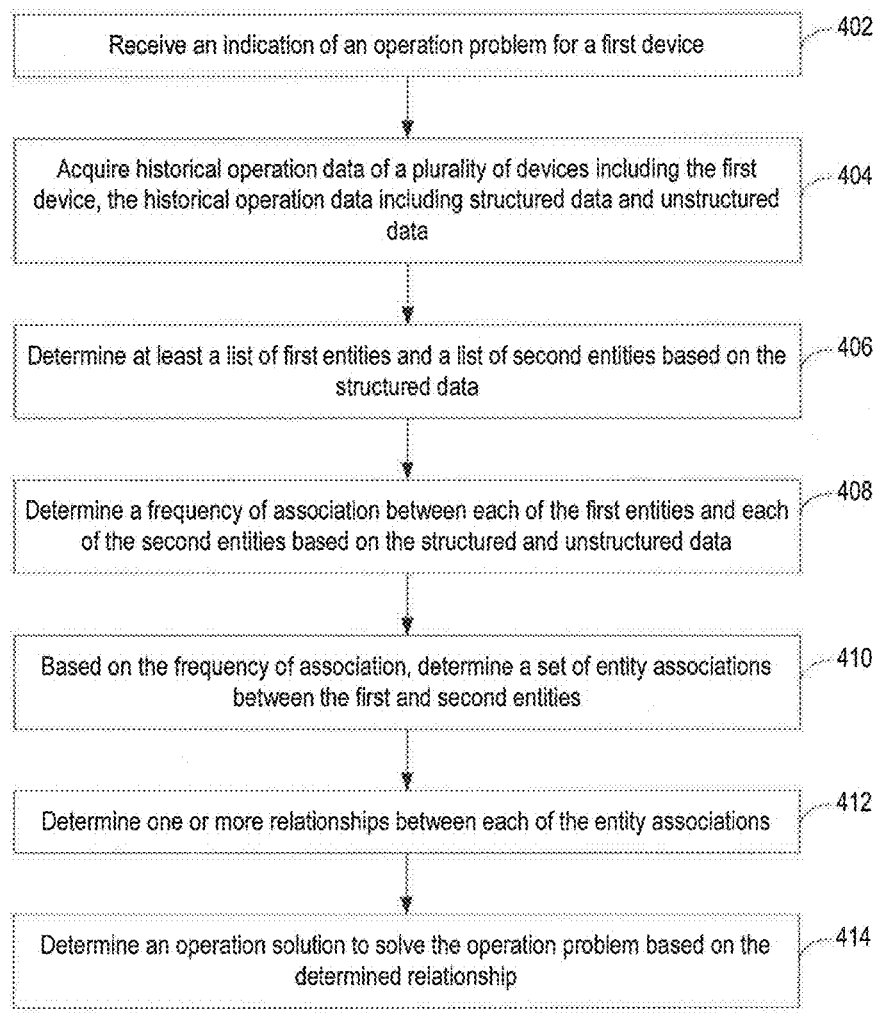
FIG. 4 illustrates an exemplary historical equipment operation data analytics method, according to some embodiments of the present disclosure.

FIG. 4 is a flow diagram illustrating an exemplary historical equipment operation data analytics method 400 in accordance with some embodiments of the present disclosure. In some embodiments, method 400 can be performed by an exemplary historical equipment operation data analytics system (e.g., system 100 of FIG. 1).

In step 402, the system may receive an indication of an operation problem for a first device. The indication can come from, for example, a ticket filed by a user about an operation problem with a device, a real-time monitoring of an operation of a device. In some embodiments, step 402 can be performed by operation problem detection module 101 of FIG. 1.

In step 404, the system may acquire historical operation data of a plurality of devices including the first device, the historical operation data including structured data and unstructured data. The structured data can include a set discrete data that are associated with specific fields which give meaning to the set of discrete data. Unstructured data, on the other hand, can include data are associated with a generic field and is not imparted with a pre-determined structure. For example, the historical operation data can include data generated from enterprise service tickets. The structured data can include data associated with a field that specifies a type of device and a field that specifies a type of operation, while the unstructured data can include associated with a description field. In some embodiments, step 404 can be performed by data extraction module 102 of FIG. 2 when acquiring historical operation data from equipment operation data database 108 of FIG. 2.

In step 406, the system may determine at least a list of first entities and a list of second entities based on the structured data. For example, the first entities can be associated with a type of device, and the second entities can be associated with an operation. In some embodiments, step 406 can be performed by data extraction module 102 of FIG. 2.

In step 408, the system may determine, based on the structured and unstructured data, a frequency of association between each of the first entities and each of the second entities. For example, the system may search for the first and second entities in the unstructured data, determine (and count) the associations based on the search result. The system may also apply certain processing to the text of the unstructured data (e.g., filtering out specific words and symbols, collapsing singular and plural variant of terms, performing lookup for words of similar meaning, etc.) before performing the search. In some embodiments, step 408 can be performed by data extraction module 102 of FIG. 2.

In step 410, the system may determine, based on the frequency of association, a set of entity associations between the first and second entities. For example, the system may determine a set of entity associations of which the frequency of association exceeds a certain threshold (e.g., 100). In some embodiments, step 410 can be performed by data extraction module 102 of FIG. 2.

In step 412, the system may determine one or more relationships between each of the entity associations. The relationship may include a degree of association and a direction that reflects a causality relationship between two entity associations. The system may represent the relationship using an adjacency matrix, and may perform certain matrix manipulation of the adjacency matrix to determine a hypothesis for a reason for the operation problem. In some embodiments, step 412 can be performed by data extraction module 102 and data analysis module 104 of FIG. 2.

In step 414, the system may determine an operation solution to solve the operation problem based on the determined relationship. For example, based on the hypothesis for the reason for the operation problem, the system may determine an operation solution that includes a set of configuration of a device. In some embodiments, the system may also receive feedback related to the operation solution, which can be used to validate the hypothesized reason of the operation problem, as well as the operation solution. In some embodiments, step 414 can be performed by operation determination module 106 of FIG. 1.

Computer System

FIG. 5 is a block diagram of an exemplary computer system for implementing embodiments consistent with the present disclosure. Variations of computer system 501 may be used for implementing the devices and systems disclosed herein. Computer system 501 may comprise a central processing unit ("CPU" or "processor") 502. Processor 502 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM47501UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User Interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described methods and systems for determining an equipment operation based on historical data. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A hardware processor-implemented method for facilitating an operation of a device, the method being performed by one or more hardware processors, comprising:
receiving an indication of an operation problem for a first device;
acquiring historical operation data of a plurality of devices including the first device, the historical operation data including structured data and unstructured data;
determining at least a list of first entities and a list of second entities based on the structured data;
determining, based on the structured and unstructured data, a frequency of association between each of the first entities and each of the second entities;

determining, based on the frequency of association, a set of entity associations, each entity association including at least one of the first entities and at least one of the second entities;

determining one or more relationships between each of the entity associations, based on:

determination of a degree of association associated with a relationship between each of the entity associations and a direction associated with the relationship, wherein the direction reflects a causality relationship; and determination of a hypothesis for a reason for the operation problem based on a resultant matrix obtained by matrix manipulation of an adjacency matrix, wherein the adjacency matrix is determined based on the degree of association and the direction; and determining, based on the one or more determined relationships, an operation solution to solve the operation problem.

2. The method of claim 1, wherein the structured data include a set of discrete data that are associated with specific fields configured to provide one or more meanings for the set of discrete data; wherein the first and second entities include the set of discrete data.

3. The method of claim 1, wherein the determination of a frequency of association between each of the first entities and each of the second entities comprises:

searching for at least one of the first entities and at least one of the second entities in the structured data and unstructured data; and determining an association between the at least one of the first entities and the at least one of the second entities based on a result of searching.

4. The method of claim 3, wherein the unstructured data is filtered based on one or more pre-determined criteria before the searching.

5. The method of claim 1, wherein the operation solution is determined based on the hypothesis for the reason; and wherein the method further comprises: receiving a feedback related to the operation solution for validating the hypothesis.

6. A system for facilitating an operation of a device, comprising:

one or more hardware processors; and a memory storing instructions executable by the one or more hardware processors for:

receiving an indication of an operation problem for a first device;

acquiring historical operation data of a plurality of devices including the first device, the historical operation data including structured data and unstructured data;

determining at least a list of first entities and a list of second entities based on the structured data;

determining, based on the structured and unstructured data, a frequency of association between each of the first entities and each of the second entities;

determining, based on the frequency of association, a set of entity associations, each entity association including at least one of the first entities and at least one of the second entities;

determining one or more relationships between each of the entity associations, based on:

determination of a degree of association associated with a relationship between each of the entity associations and a direction associated with the relationship, wherein the direction reflects a causality relationship; and determination of a hypothesis for a reason for the operation problem based on a resultant matrix obtained by matrix manipulation of an adjacency matrix, wherein the adjacency matrix is determined based on the degree of association and the direction; and determining, based on the one or more determined relationships, an operation solution to solve the operation problem.

7. The system of claim 6, wherein the structured data include a set of discrete data that are associated with specific fields configured to provide one or more meanings to the set of discrete data; wherein the first and second entities include the set of discrete data.

8. The system of claim 6, wherein the determination of a frequency of association between each of the first entities and each of the second entities comprises the memory storing instructions executable by the one or more hardware processors for:

searching for at least one of the first entities and at least one of the second entities in the structured data and unstructured data; and determining an association between the at least one of the first entities and the at least one of the second entities based on a result of searching.

9. The system of claim 8, wherein the unstructured data is filtered based on one or more pre-determined criteria before the searching.

10. The system of claim 6, wherein the operation solution is determined based on the hypothesis for the reason; and wherein the memory further stores instructions executable by the one or more hardware processors for: receiving a feedback related to the operation solution for validating the hypothesis.

11. A non-transitory computer readable storage medium storing a program that, when executed by one or more hardware processors, causes the one or more hardware processors to perform a method for facilitating an operation of a device, the method comprising:

receiving an indication of an operation problem for a first device;

acquiring historical operation data of a plurality of devices including the first device, the historical operation data including structured data and unstructured data;

determining at least a list of first entities and a list of second entities based on the structured data;

determining, based on the structured and unstructured data, a frequency of association between each of the first entities and each of the second entities;

determining, based on the frequency of association, a set of entity associations, each entity association including at least one of the first entities and at least one of the second entities;

determining one or more relationships between each of the entity associations, based on:

determination of a degree of association associated with a relationship between each of the entity associations and a direction associated with the relationship, wherein the direction reflects a causality relationship; and determination of a hypothesis for a reason for the operation problem based on a resultant matrix obtained by matrix manipulation of an adjacency matrix, wherein the adjacency matrix is determined based on the degree of association and the direction; and determining, based on the one or more determined relationships, an operation solution to solve the operation problem.

12. The medium of claim 11, wherein the structured data include a set of discrete data that are associated with specific fields configured to provide one or more meanings to the set of discrete data; wherein the first and second entities include the set of discrete data.

13. The medium of claim 11, wherein the determination of a frequency of association between each of the first entities and each of the second entities comprises:

searching for at least one of the first entities and at least one of the second entities in the structured data and unstructured data; and determining an association between the at least one of the first entities and the at least one of the second entities based on a result of searching.

14. The medium of claim 13, wherein the unstructured data is filtered based on one or more pre-determined criteria before the searching.

15. The medium of claim 11, wherein the operation solution is determined based on the hypothesis for the reason; and wherein the method further comprises: receiving a feedback related to the operation solution for validating the hypthesis.

* * * * *